US012640317B2

(12) United States Patent
Tannhäuser et al.

(10) Patent No.: US 12,640,317 B2
(45) Date of Patent: May 26, 2026

(54) CIRCUIT BREAKER

(71) Applicant: SIEMENS AKTIENGESELLSCHAFT, Munich (DE)

(72) Inventors: Marvin Tannhäuser, Hausen (DE); Fabian Döbler, Theilenhofen (DE); Felix Frei, Marienberg Ot Zöblitz (DE)

(73) Assignee: Siemens Aktiengesellschaft, Munich (DE)

(*) Notice: Subject to any disclaimer, the term of this patent is extended or adjusted under 35 U.S.C. 154(b) by 158 days.

(21) Appl. No.: 18/696,531

(22) PCT Filed: Jun. 29, 2022

(86) PCT No.: PCT/EP2022/067897
§ 371 (c)(1),
(2) Date: Mar. 28, 2024

(87) PCT Pub. No.: WO2023/051962
PCT Pub. Date: Apr. 6, 2023

(65) Prior Publication Data

US 2025/0046540 A1 Feb. 6, 2025

(30) Foreign Application Priority Data

Sep. 28, 2021 (DE) ..................... 10 2021 210 829.6

(51) Int. Cl.
*H01H 9/54* (2006.01)
*H01H 71/12* (2006.01)

(52) U.S. Cl.
CPC ............ *H01H 9/548* (2013.01); *H01H 9/547* (2013.01); *H01H 71/12* (2013.01); *H01H 71/125* (2013.01)

(58) Field of Classification Search
CPC ........ H01H 9/547; H01H 9/548; H01H 71/12; H01H 71/125
(Continued)

(56) References Cited

U.S. PATENT DOCUMENTS 11,538,642 B2 12/2022 Hussmann
2020/0083699 A1 * 3/2020 Kennedy ............. H02H 7/0833
(Continued)

FOREIGN PATENT DOCUMENTS

DE 202009014759 U1 * 2/2010 ............. H01H 9/548
DE 102018213354 A1 2/2020
(Continued)

OTHER PUBLICATIONS

Machine translation fo E. Dold & Sohne KG German Patent Document DE 202009014759 U1 Feb. 2010 (Year: 2010).*

*Primary Examiner* — Kevin J Comber
(74) *Attorney, Agent, or Firm* — Laurence A. Greenberg; Werner H. Stemer; Ralph E. Locher

(57) ABSTRACT

A circuit breaker for protecting electric low-voltage circuits includes a housing with grid-side connections and a load-side connection. A mechanical isolating contact unit is series-connected to an electronic interruption unit. The isolating contact unit pairs with the load-side connection, and the electronic interruption unit pairs with the grid-side connections. The current level in the low-voltage circuit, between a grid-side phase conductor connection and load-side phase conductor connection, is ascertained. Prevention of current flow in the low-voltage circuit is initiated upon exceeding current thresholds and/or current/time thresholds. A series circuit of a measuring impedance and switch in the circuit breaker between conductors of the low-voltage circuit causes a measuring current flow through the electronic interruption unit via the grid-side connections when the
(Continued)

switch is closed and the electronic interruption unit is switched to low-ohmic state.

19 Claims, 2 Drawing Sheets

(58) Field of Classification Search
USPC .......................................................... 361/115
See application file for complete search history.

(56) References Cited

U.S. PATENT DOCUMENTS

| | | | | |
|---|---|---|---|---|
| 2020/0366078 | A1* | 11/2020 | Telefus | H02H 1/0092 |
| 2021/0066013 | A1* | 3/2021 | Kumar | H01H 71/123 |
| 2021/0296059 | A1* | 9/2021 | Hussmann | H01H 9/02 |
| 2022/0139644 | A1* | 5/2022 | Niehoff | H02H 9/02 200/42.01 |

FOREIGN PATENT DOCUMENTS

| | | | |
|---|---|---|---|
| DE | 102021210821 | A1 | 3/2023 |
| DE | 102021210829 | A1 | 3/2023 |
| DE | 102021210834 | A1 | 3/2023 |

* cited by examiner

CIRCUIT BREAKER

FIELD AND BACKGROUND OF THE INVENTION

The invention relates to the technical field of a circuit breaker device for a low-voltage circuit having an electronic interruption unit and to a method for a circuit breaker device for a low-voltage circuit having an electronic interruption unit.

Low voltage is understood to mean voltages of up to 1000 volts AC or up to 1500 volts DC. Low voltage is understood in particular to mean voltages that are greater than extra-low voltage, with values of 50 volts AC or 120 volts DC.

A low-voltage circuit or grid or installation is understood to mean circuits with nominal currents or rated currents of up to 125 amperes, more specifically up to 63 amperes. A low-voltage circuit is understood to mean in particular circuits with nominal currents or rated currents of up to 50 amperes, 40 amperes, 32 amperes, 25 amperes, 16 amperes or 10 amperes. Said current values are understood to mean in particular nominal, rated or/and shutdown currents, that is to say the maximum current that is normally carried through the circuit or in the case of which the electrical circuit is usually interrupted, for example by a protection device, such as a circuit breaker device, miniature circuit breaker or power circuit breaker. The nominal currents may be gradated further, from 0.5 A through 1 A, 2 A, 3 A, 4 A, 5 A, 6 A, 7 A, 8 A, 9 A, 10 A, etc. up to 16 A.

Miniature circuit breakers are overcurrent protection devices that have long been known and that are used in low-voltage circuits in electrical installation engineering.

They protect lines against damage caused by heating due to excessively high current and/or a short circuit. A miniature circuit breaker may automatically shut down the circuit in the event of an overload and/or short circuit. A miniature circuit breaker is not a fuse element that resets automatically.

In contrast to miniature circuit breakers, power circuit breakers are intended for currents greater than 125 A, in some cases also starting from 63 amperes. Miniature circuit breakers therefore have a simpler and more delicate design. Miniature circuit breakers usually have a fastening option for fastening to a so-called top-hat rail (carrier rail, DIN rail, TH35).

Miniature circuit breakers have an electromechanical design. In a housing, they have a mechanical switching contact or operating current tripping device for interrupting (tripping) the electric current. A bimetal protection element or bimetal element is usually used for tripping (interruption) in the event of a sustained overcurrent (overcurrent protection), respectively in the event of a thermal overload (overload protection). An electromagnetic tripping device with a coil is used for brief tripping in the event of an overcurrent limit value being exceeded or in the event of a short circuit (short circuit protection). One or more arc extinguishing chambers or arc extinguishing devices are provided. Connection elements for conductors of the electrical circuit to be protected are also provided.

Circuit breaker devices having an electronic interruption unit are relatively recent developments. They have a semiconductor-based electronic interruption unit. In other words, the electric current flow in the low-voltage circuit is guided via semiconductor components or semiconductor switches that are able to interrupt the electric current flow or are able to be switched to the on state. Circuit breaker devices having an electronic interruption unit often also have a mechanical isolating contact system, in particular with isolator properties in accordance with the applicable standards for low-voltage circuits, wherein the contacts of the mechanical isolating contact system are connected in series with the electronic interruption unit, that is to say the current of the low-voltage circuit to be protected is guided both through the mechanical isolating contact system and through the electronic interruption unit.

The present invention relates in particular to low-voltage AC circuits having an AC voltage, usually having a time-dependent sinusoidal AC voltage of frequency f. The temporal dependency of the instantaneous voltage value u (t) of the AC voltage is described by the equation:

$$u(t) = U * \sin(2\pi * f * t),$$

wherein:

u(t)=instantaneous voltage value at the time t

U=amplitude of the voltage

A harmonic AC voltage may be represented by the rotation of a vector the length of which corresponds to the amplitude (U) of the voltage. The instantaneous deviation is in this case the projection of the vector onto a coordinate system. An oscillation period corresponds to a full revolution of the vector and its full angle is 2π (2pi) or 360°. The angular frequency is the rate of change of the phase angle of this rotating vector. The angular frequency of a harmonic oscillation is always 2π times its frequency, that is to say:

$$\omega = 2\pi * f = 2\pi/T = \text{angular frequency of the AC voltage}$$

(T=period duration of the oscillation).

It is often preferred to give the angular frequency (ω) rather than the frequency (f), since many formulae in oscillation theory are able to be represented more compactly using the angular frequency due to the occurrence of trigonometric functions the period of which is by definition 2π:

$$u(t) = U * \sin(\text{wt})$$

In the case of non-temporally constant angular frequencies, the term instantaneous angular frequency is also used.

In the case of a sinusoidal, in particular temporally constant, AC voltage, the time-dependent value formed from the angular velocity ω and time t corresponds to the time-dependent angle φ(t), which is also referred to as phase angle φ(t). In other words, the phase angle φ(t) periodically runs through the range 0 . . . 2π or 0° . . . 360°. In other words, the phase angle periodically adopts a value between 0 and 2π or 0° and 360° (φ=n*(0 . . . 2π) or φ=n*(0° . . . 360°), owing to periodicity; for short: φ=0 . . . 2π or φ=0° . . . 360°).

Instantaneous voltage value u (t) is therefore understood to mean the instantaneous value of the voltage at the time t, that is to say, in the case of a sinusoidal (periodic) AC voltage, the value of the voltage at the phase angle φ (φ=0 . . . 2π or φ=0° . . . 360°, of the respective period).

SUMMARY OF THE INVENTION

The object of the present invention is to improve a circuit breaker device of the type mentioned at the outset, in particular to propose a new design for a circuit breaker device in order to improve the safety of such a circuit breaker device or to achieve greater safety in the electrical low-voltage circuit to be protected by the circuit breaker device.

This object is achieved by a circuit breaker device having the features described below or by a method having the steps described below.

According to the invention, what is proposed is a circuit breaker device for protecting an electrical low-voltage circuit, in particular low-voltage AC circuit, having:

- a housing having grid-side connections and at least one load-side connection,
- a mechanical isolating contact unit that is connected in series with an electronic interruption unit, wherein the mechanical isolating contact unit is assigned to the load-side connection and the electronic interruption unit is assigned to the grid-side connections,
- wherein the mechanical isolating contact unit is able to be switched by opening at least one contact so as to avoid a current flow or closing the at least one contact to allow a current flow in the low-voltage circuit,
- wherein the electronic interruption unit is able to be switched by semiconductor-based switching elements to a high-resistance state of the switching elements so as to avoid a current flow or a low-resistance state of the switching elements so as to allow a current flow in the low-voltage circuit,
- a current sensor unit for ascertaining the level of the current of the low-voltage circuit,
- a control unit that is connected to the current sensor unit, the mechanical isolating contact unit and the electronic interruption unit, wherein, in the event of current or/and current-time limit values being exceeded, avoidance of a current flow in the low-voltage circuit is initiated.

According to the invention, a series circuit consisting of a measurement impedance and a switch is provided between conductors of the low-voltage circuit such that, when the switch is closed and the electronic interruption unit is switched to the low-resistance state, a measurement current flows through the electronic interruption unit via the grid-side connections.

In other words, what is proposed is an activatable measurement impedance such that a measurement current or a defined potential is able to be generated selectively in the circuit breaker device.

The series circuit consisting of the measurement impedance and the switch may be connected for example to the connection between mechanical isolating contact unit and electronic interruption unit on one side. On the other side, the measurement impedance may be connected for example to the other conductor, in particular to the other conductor at the grid-side connection.

A measurement current is able to flow selectively through the mechanical isolating contact unit arranged between two conductors upstream of the load-side connection, in particular upstream of the mechanical isolating contact unit assigned to the load-side connection, when the contacts of the mechanical isolating contact unit are open, that is to say when the load/consumer is disconnected from the grid side (power source). The measurement current May advantageously be used to test the function of the circuit breaker device. This embodiment thus enables a safe circuit breaker device, thereby increasing the safety in the low-voltage circuit.

For instance, when the switch is closed and the contacts of the mechanical isolating contact unit are open and the electronic interruption unit is switched to the low-resistance state, a measurement current is able to flow through the electronic interruption unit via the grid-side connections.

Advantageous embodiments of the invention are indicated in the dependent claims and in the exemplary embodiment.

In one advantageous embodiment of the invention, the measurement impedance is an electrical resistor or/and capacitor, that is to say a single element or a series or parallel circuit consisting of an electrical resistor and a capacitor, or alternatively a series and parallel circuit consisting of two, three, four, five, etc. elements.

Specifically, the measurement impedance may have a high resistance value or impedance value in order advantageously to keep losses low. Owing to the switchable measurement impedance, that is to say the series circuit consisting of a measurement impedance (ZM) and a switch (Smeas), the measurement impedance may advantageously have a lower resistance value, since losses caused by temporary activation are limited by way of the switch. In particular, the resistance value may thereby be less than 1 Mohm, 500 kohm, 100 kohm, 50 kohm, 10 kohm, 5 kohm, 1 kohm, 500 ohm or 100 ohm. In a 230 V low-voltage circuit, the use of a measurement resistor of for example 1 Mohm leads to losses of around 50 mw.

In one advantageous embodiment, the level of the value of the measurement impedance is dimensioned such that, when the electronic interruption unit is in the high-resistance state and the measurement impedance is switched on (closed switch) and the contacts of the mechanical isolating contact unit are closed, the voltage across the load-side connections (or the at least one load-side connection in relation to the other potential) is less than a first voltage level. By way of example, the first voltage level may correspond to or be less than the maximum value of the protective extra-low voltage (50 V AC RMS value). Advantageously, the voltage caused by a leakage current from the electronic interruption unit across the load-side connections is thus reduced or defined.

In one advantageous embodiment of the invention, the switch is a controllable switch. In one advantageous embodiment of the invention, the switch is connected to the control unit such that the switch is able to be switched on and off by the control unit.

By way of example, the switch may be a relay, such as a Reed relay, or what is known as an analog switch, that is to say a switch that is able to be switched by a control signal (on/off), wherein the switched signal (measurement current) may be an analog (or digital) signal. The switch may also be an electronic switch, such as for example a TRIC, thyristor, IGBT or MOSFET.

This has the particular advantage that the control unit is able to generate a measurement current depending on the state of the electronic interruption unit.

In one advantageous embodiment of the invention, the circuit breaker device is designed such that the switch is switched on when the electronic interruption unit is in the high-resistance state. This has the particular advantage that, when the electronic interruption unit is in the high-resistance state and the contacts of the mechanical isolating contact unit are closed, a defined (low) potential is present at the load-side connections. The potential is determined by the level of the (activated) measurement impedance. For example, the lower the resistance value of the measurement impedance, the lower the potential difference across the load-side connections. The potential difference is also determined by the leakage current from the electronic interruption unit. The lower the leakage current from the electronic interruption unit, the lower the potential difference/voltage drop across the (activated) measurement impedance.

In one advantageous embodiment of the invention, the circuit breaker device is designed such that the switch is switched off when the electronic interruption unit is in the low-resistance state.

This has the particular advantage that, when the electronic interruption unit is in the low-resistance state and the contacts of the mechanical isolating contact unit are closed, that is to say usually during normal operation of the circuit breaker device, generally with a connected consumer/load, the power loss caused by the measurement impedance is reduced since the measurement impedance is switched off.

In one advantageous embodiment of the invention, the circuit breaker device is designed such that the switch is switched on when the electronic interruption unit is in the high-resistance state and switched off when the electronic interruption unit is in the low-resistance state.

This has the particular advantage of enabling a simple (basic) implementation of the switching behavior of the switch coupled to the switching behavior of the electronic interruption unit, such that, when the contacts of the mechanical isolating contact unit are closed, a defined potential is achieved at the load-side connections, on the one hand, and minimized power loss is achieved, on the other hand.

In one advantageous embodiment of the invention, the circuit breaker device is designed such that, when the electronic interruption unit is in the high-resistance state and the switch is switched on, the level of the current is ascertained by way of the current sensor unit. In the event of a first current threshold value being exceeded, a faulty electronic interruption unit is inferred. In the event of a first current threshold value being exceeded, a lack of ability of the electronic interruption unit to switch off is usually present, that is to say a high-resistance state is no longer present. By way of example, the semiconductor-based switching elements have broken down (always on/short-circuited). In the event of a first current threshold value being exceeded, in the case of which a faulty electronic interruption unit is inferred, the circuit breaker device may be designed such that the mechanical isolating contact unit is no longer able to be closed or is opened. This has the particular advantage that the electronic interruption unit, in particular the high-resistance state thereof, is tested by the (activatable) measurement impedance. In the event of lack of or insufficient high resistance, appropriate protective measures, such as preventing closure of the contacts (if these are not yet closed) or opening the contacts, may be carried out. This state may likewise be reported.

The first current threshold value may be in the range of less than 50 mA, advantageously be less than 6 mA.

In one advantageous embodiment of the invention, the circuit breaker device is designed such that, in order to test the function of the circuit breaker device when the contacts of the mechanical isolating contact unit are open and the electronic interruption unit is switched to the high-resistance state and the switch is switched on, the electronic interruption unit is switched to a low-resistance state for a first time interval without the switch being switched off, such that the measurement current flows through the measurement impedance in order to test the function of the circuit breaker device, in particular of the electronic interruption unit.

In other words, the electronic interruption unit is switched to the low-resistance state starting from the high-resistance state for a first time interval and is then back in the high-resistance state.

The first time interval may be in the range of 100 μs to 1 s, for example 100 μs, 200 μs, . . . , 1 ms, 2 ms, . . . , 10 ms, 11 ms, . . . , 20 ms, 21 ms, . . . 100 ms, . . . , 200 ms, . . . , 1 s.

For switching times in the range of 1 ms to 2 ms, a voltage change may be detected in order to perform the function test. For time intervals of 20 ms to 100 ms or 1 s, it May be checked (multiple times) whether for instance 0 V voltage (instantaneous or then even RMS value of the voltage) is present across the electronic interruption unit.

This has the particular advantage that the electronic interruption unit is able to be checked with regard to its "ability to switch on", wherein the (switched-on) measurement impedance causes a detectable measurement current for the function test.

The function test of the circuit breaker device may:

- comprise ascertaining the level of the measurement current by way of the current sensor unit, in particular comparing the level of the ascertained measurement current with a reference measurement current level and, in the event of a deviation from the reference measurement current level that is outside a first tolerance range, inferring a faulty circuit breaker device (it is in particular possible to infer a faulty electronic interruption unit; the first tolerance range may be a (further) current limit;
- in other words, if the current is too large, a faulty electronic interruption unit is present;
- if the current is too small, the measurement impedance could be faulty).

In the event of a deviation from the reference measurement current level that is outside a first tolerance range, the mechanical isolating contact unit for example is not able to be closed or is opened, or(/and)

- comprise ascertaining the level of a voltage across the electronic interruption unit, in particular comparing the level of the ascertained voltage with a reference voltage level and, in the event of a deviation from the reference voltage level that is outside a second tolerance range, inferring a faulty electronic interruption unit, in particular not being able to close or opening the mechanical isolating contact unit.

As an alternative or in addition, the level of the ascertained voltage may in particular also be compared with the reference voltage level and, in the event of the reference voltage level being exceeded, a faulty electronic interruption unit is inferred, in particular the mechanical isolating contact unit is not able to be closed or is opened.

This has the particular advantage that it is possible to perform a test on the low-resistance state of the electronic interruption unit, with the presence of a correct measurement current in the low-resistance state being checked.

The reference measurement current level is for example equal to the value of the level of the grid voltage currently being applied (voltage, low voltage) divided by the value of the level of the measurement impedance. In the case for example of a 230 V low voltage currently being applied (RMS value) and a value of the level of the measurement impedance of 10 kohm, the reference measurement current level is 23 mA. The first tolerance range may for example be +/−10% (or +/−20%) of this value.

The reference voltage level for checking the low-resistance state of the electronic interruption unit has for example values of or less than 1 V, more generally less than 2 V. In other words, in the alternative, a faulty interruption unit is inferred when this reference voltage level is exceeded. The second tolerance range may for example be +/− 10% to +/−100% of this value.

In one advantageous embodiment of the invention, the circuit breaker device is designed such that the measurement current is used to calibrate the level of the current ascertained by the current sensor unit, in particular after an abovementioned function test has been (at least partially) performed.

This has the particular advantage that the (activated) measurement impedance (known size and thus known measurement current) may be used to calibrate the current sensor unit.

In one advantageous embodiment of the invention, the circuit breaker device is designed such that, in order to test the function of the circuit breaker device—when the contacts of the mechanical isolating contact unit are closed and the electronic interruption unit is switched to the low-resistance state and when the switch is switched off—the switch is switched to a closed state for a first time range such that an additional current caused by the measurement resistor flows through the electronic interruption unit, the level of which (of the additional current) is ascertained (by way of the current sensor unit or/and control unit), is compared with additional current values and, in the event of a deviation outside a third tolerance range, an additional current fault condition is present. If no consumer or load is connected to the load-side connections, the underlying output current may have the value zero. In this case, the level of the current is determined by the level of the additional current.

This has the particular advantage that, in the event of a lack of consumer or during operation of the circuit breaker device, the current sensor unit or the ascertaining of the level of the current is able to be checked.

The first time range may be in the range of 10 ms to 10 s.

In one advantageous embodiment of the invention, the switch is switched to a closed state for the first time range when the level of the current ascertained by the current sensor unit falls below a first current level. The first current level may be less than 5 A, 1 A or in particular less than 0.5 A.

This advantageously makes it possible in particular to ascertain a faulty circuit breaker device, in particular a faulty current sensor unit or current detection. The current sensor unit or the ascertaining of the level of the current may thus be checked in the absence of a consumer.

In one advantageous embodiment of the invention, the circuit breaker device is designed such that the level of the voltage across the electronic interruption unit is able to be ascertained (for a conductor).

This has the particular advantage that specifically the level of the voltage between grid-side connection point and load-side connection point of the electronic interruption unit is able to be ascertained or is ascertained.

In one advantageous embodiment of the invention, the circuit breaker device is designed such that, when the contacts of the mechanical isolating contact unit are open and the switch is switched on, the level of the voltage defined by the switched-on measurement impedance across the electronic interruption unit is ascertained when the electronic interruption unit is switched to the high-resistance state. In the event of a first voltage threshold value being fallen below, a first fault condition is present, meaning that a situation whereby the electronic interruption unit changes to the low-resistance state (possibly again or for the first time) is avoided or/and the mechanical isolating contact unit is not able to be closed or is opened. (In other words, in the event of the first voltage threshold value being exceeded, a fault condition is not present.)

This is used to check the electronic interruption unit in terms of its "ability to switch off", that is to say the changing of the semiconductor-based switching elements to the high-resistance state. The first voltage threshold value depends on the level of the measurement impedance. By way of example, the voltage across the (functional) switched-off (high-resistance) electronic interruption unit corresponds to the applied grid voltage minus the voltage drop across the measurement impedance. The voltage across the measurement impedance is equal to the leakage current multiplied by the level of the value of the measurement impedance. By way of example, in the case of a leakage current of 0.1 mA and a measurement impedance of 20 kohm, the voltage drop is 2 V, and the first voltage threshold value is thus for example smaller 230 V−2 V=228 V (in RMS values).

This has the particular advantage of enabling a simple check with regard to the switch-off behavior of the electronic interruption unit, wherein the measurement impedance generates a defined potential, on the one hand, and a defined voltage level in conjunction with (the ascertainable) high-resistance impedance of the electronic interruption unit due to the level of the resistance or impedance value of the measurement impedance, on the other hand.

In one advantageous embodiment of the invention, when the electronic interruption unit is switched to the low-resistance state for the first time interval without the switch being switched off, the level of the voltage across the electronic interruption unit is ascertained. In the event of a second voltage threshold value being exceeded, a second fault condition is present, meaning that a situation whereby the electronic interruption unit changes to the low-resistance state again or subsequently is avoided or/and the mechanical isolating contact unit is not able to be closed or is opened. (In other words, in the event of the second voltage threshold value being fallen below, a fault condition is not present.)

The second voltage threshold value should be 1 volt or better still less than 1 volt.

This has the particular advantage that the electronic interruption unit is able to be checked more accurately with regard to its "ability to switch on", with a defined potential being provided by the switched-on measurement impedance.

In one advantageous embodiment of the invention, when a fault condition (of the two) is present, closure of the contacts of the mechanical isolating contact unit is avoided. In particular, no enable signal (enable) is output to the mechanical isolating contact unit. In other words, it is not possible to close the contacts of the mechanical isolating contact unit using a handle.

It is also possible to avoid a situation whereby the electronic interruption unit changes to the low-resistance state.

As an alternative or in addition, the mechanical isolating contact unit may be opened.

There may also be other fault conditions.

This has the particular advantage that only a functional circuit breaker device having a functional electronic interruption unit is able to be switched on or, in the event of a defective circuit breaker device, which is able to be ascertained by the measurement impedance according to the invention, the low-voltage circuit is interrupted. This thus increases the operational safety of the circuit breaker device and thereby also in the low-voltage circuit.

This thus ensures that the ability of the electronic interruption unit to switch on and off is functional.

In one advantageous embodiment of the invention, the circuit breaker device may furthermore be designed such that provision is made for further embodiments:

a housing having a grid-side neutral conductor connection, a grid-side phase conductor connection, a load-side neutral conductor connection, a load-side phase conductor connection of the low-voltage circuit, an in particular two-pole (specifically in the case of a single-phase circuit) mechanical isolating contact unit having load-side connection points and grid-side connection points, wherein the load-side connection points are connected to the load-side neutral and phase conductor connections, such that it is possible to switch between opening contacts so as to avoid a current flow or closing the contacts to allow a current flow in the low-voltage circuit, an in particular single-pole electronic interruption unit, having a grid-side connection point that is electrically connected to the grid-side phase conductor connection, and a load-side connection point that is connected to a grid-side connection point of the mechanical isolating contact unit, wherein the electronic interruption unit, by virtue of semiconductor-based switching elements, has a high-resistance state of the switching elements so as to avoid a current flow or a low-resistance state of the switching elements so as to allow a current flow in the low-voltage circuit, a current sensor unit for ascertaining the level of the current of the low-voltage circuit, a control unit that is connected to the current sensor unit, the mechanical isolating contact unit and the electronic interruption unit, wherein, in the event of current or/and current-time limit values being exceeded, avoidance of a current flow in the low-voltage circuit is initiated.

The level of the voltage between grid-side connection point and load-side connection point of the electronic interruption unit is able to be ascertained or is ascertained.

For this purpose, provision may be made for at least one voltage sensor unit connected to the control unit. In the case of multiple voltage sensor units, these are connected to the control unit.

The invention proposes a novel architecture or structural embodiment of a circuit breaker device that is used to achieve increased operational safety of a circuit breaker device or of the low-voltage circuit.

In one advantageous embodiment of the invention, provision is made for a first voltage sensor unit that is connected to the control unit and that ascertains the level of a/the first voltage across the electronic interruption unit, in particular between grid-side connection point and load-side connection point of the electronic interruption unit.

This has the particular advantage of enabling a simple solution with only one voltage sensor unit.

In one advantageous embodiment of the invention, as an alternative or in addition, provision is made for a second voltage sensor unit that is connected to the control unit and that ascertains the level of a second voltage between grid-side neutral conductor connection and grid-side phase conductor connection. Provision is furthermore made for a third voltage sensor unit that is connected to the control unit and that ascertains the level of a third voltage between grid-side neutral conductor connection and load-side connection point of the electronic interruption unit. The circuit breaker device is designed such that the level of a/the first voltage between grid-side connection point and load-side connection point of the electronic interruption unit is ascertained from the difference between second and third voltage.

This has the particular advantage of enabling a further solution based on conventional voltage measurements. A more extensive test of the circuit breaker device is additionally enabled.

In one advantageous embodiment of the invention, the current sensor unit is provided on the circuit side between grid-side phase conductor connection and load-side phase conductor connection. The current sensor unit is in particular provided between grid-side phase conductor connection and mechanical isolating contact unit, in particular such that the measurement current caused by the switched-on switch is able to be detected by the current sensor unit.

This has the particular advantage of enabling a compact two-part division of the device, with an electronic interruption unit in the phase conductor next to the current sensor unit, on the one hand, and a continuous neutral conductor, on the other hand. Furthermore, a current sensor unit in the phase conductor achieves more extensive monitoring with regard to currents both in the circuit itself and in the case of fault-to-ground currents.

In one advantageous embodiment of the invention, the circuit breaker device is designed such that the contacts of the mechanical isolating contact unit are able to be opened, but not closed, by the control unit.

This has the particular advantage of achieving increased operational safety, since the contacts cannot accidentally be closed by the control unit.

In one advantageous embodiment of the invention, the mechanical isolating contact unit is able to be operated by a mechanical handle in order to switch between opening contacts or closing the contacts.

This has the particular advantage of enabling the functionality of a conventional miniature circuit breaker.

In one advantageous embodiment of the invention, the mechanical isolating contact unit is designed such that it is possible to close the contacts using the mechanical handle only after an enable, in particular an enable signal.

This has the particular advantage of enabling increased protection and increased operational safety, since switching-on of a defective circuit breaker device is avoided.

In one advantageous embodiment of the invention, provision is made for a power supply, in particular for the control unit, which power supply is connected to the grid-side neutral conductor connection and the grid-side phase conductor connection. Advantageously, specifically the measurement impedance may be connected to the power supply conductor connected to the grid-side neutral conductor connection.

This has the particular advantage of enabling a compact electronic assembly.

In one advantageous embodiment of the invention, when the contacts of the mechanical isolating contact unit are closed and the interruption unit is in the low-resistance state and in the event of an ascertained current that exceeds a first current value, in particular when the first current value is exceeded for a first time limit, the electronic interruption unit changes to the high-resistance state and the mechanical isolating contact unit remains closed, in the event of an ascertained current that exceeds a (higher) second current value, in particular for a second time limit, the electronic interruption unit changes to the high-resistance state and the mechanical isolating contact unit is opened, in the event of an ascertained current that exceeds an (even higher) third current value, the electronic interruption unit changes to the high-resistance state and the mechanical isolating contact unit is opened.

This has the particular advantage of providing a stepped deactivation concept for a circuit breaker device according to the invention in the event of increased currents.

In one advantageous embodiment of the invention, the control unit has a microcontroller.

This has the particular advantage that the functions according to the invention for increasing the safety of a circuit breaker device or of the electrical low-voltage circuit to be protected are able to be implemented by an (adaptable) computer program product. Changes and improvements to the functions may thereby also be loaded individually onto a circuit breaker device.

According to the invention, provision may be made for a corresponding method for a circuit breaker device for a low-voltage circuit comprising electronic (semiconductor-based) switching elements having the same and further advantages.

The method for a circuit breaker device for protecting an electrical low-voltage circuit having:

- a housing having grid-side connections and at least one load-side connection,
- a mechanical isolating contact unit that is connected in series with an electronic interruption unit, wherein the mechanical isolating contact unit is assigned to the load-side connection and the electronic interruption unit is assigned to the grid-side connections,
- wherein the mechanical isolating contact unit is able to be switched by opening contacts so as to avoid a current flow or closing the contacts to allow a current flow in the low-voltage circuit,
- wherein the electronic interruption unit is able to be switched by semiconductor-based switching elements to a high-resistance state of the switching elements so as to avoid a current flow or a low-resistance state of the switching elements so as to allow a current flow in the low-voltage circuit,
- wherein the level of the current of the low-voltage circuit is ascertained and, in the event of current or/and current-time limit values being exceeded, avoidance of a current flow in the low-voltage circuit is initiated,
- wherein, in the circuit breaker device, a series circuit consisting of a measurement impedance and a switch is provided between conductors of the low-voltage circuit such that, when the switch is closed and the electronic interruption unit is switched to the low-resistance state, a measurement current flows through the electronic interruption unit via the grid-side connections.

Advantageously, the switch is switched on when the electronic interruption unit is in the high-resistance state and switched off when the electronic interruption unit is in the low-resistance state. This thus makes it possible to generate a defined potential when the electronic interruption unit is in the high-resistance state and to minimize losses caused by the measurement impedance when the electronic interruption unit is in the low-resistance state.

When the electronic interruption unit is in the high-resistance state and the switch is switched on, in particular the contacts of the mechanical isolating contact unit are open, the level of the current may be ascertained by way of the current sensor unit in order to test the function of the circuit breaker device. In the event of a first current threshold value being exceeded, a faulty electronic interruption unit is inferred. As a result of this, the mechanical isolating contact unit is not be able to be closed or is opened.

To test the function of the circuit breaker device, the electronic interruption unit is switched to a low-resistance state for a first time interval when the contacts of the mechanical isolating contact unit are open, the switch is closed/switched on and the electronic interruption unit is switched to the high-resistance state. When the electronic interruption unit is switched to the low-resistance state for the first time interval, the level of the current (measurement current) or/and the voltage across the electronic interruption unit is ascertained. The level of the ascertained measurement current is compared with a reference measurement current level and, in the event of a deviation from the reference measurement current level that is outside a first tolerance range, a faulty circuit breaker device is inferred. The mechanical isolating contact unit is not able to be closed or is opened.

When ascertaining the level of a voltage across the electronic interruption unit, the level of the ascertained voltage is compared with a reference voltage level and, in the event of a deviation from the reference voltage level that is outside a second tolerance range, a faulty electronic interruption unit is inferred. The mechanical isolating contact unit is not able to be closed or is opened.

According to the invention, a corresponding computer program product may be claimed. The computer program product comprises instructions that, when the program is executed by a microcontroller, prompt said microcontroller to improve the safety of such a circuit breaker device or to achieve greater safety in the electrical low-voltage circuit to be protected by the circuit breaker device. The microcontroller is part of the circuit breaker device, in particular of the control unit.

According to the invention, a corresponding computer-readable storage medium on which the computer program product is stored may also be claimed.

According to the invention, a corresponding data carrier signal that transfers the computer program product may also be claimed.

All embodiments, both in dependent form referring back to the independent claims and referring back only to individual features or combinations of features of patent claims, bring about an improvement in a circuit breaker device, in particular an improvement in the safety of a circuit breaker device or, as a result, of the electrical circuit, and provide a novel concept for a circuit breaker device.

The described properties, features and advantages of this invention and the way in which these are achieved will become clearer and more clearly comprehensible in connection with the following description of the exemplary embodiments, which are explained in more detail in connection with the figures.

DETAILED DESCRIPTION OF THE INVENTION

Figure 1:
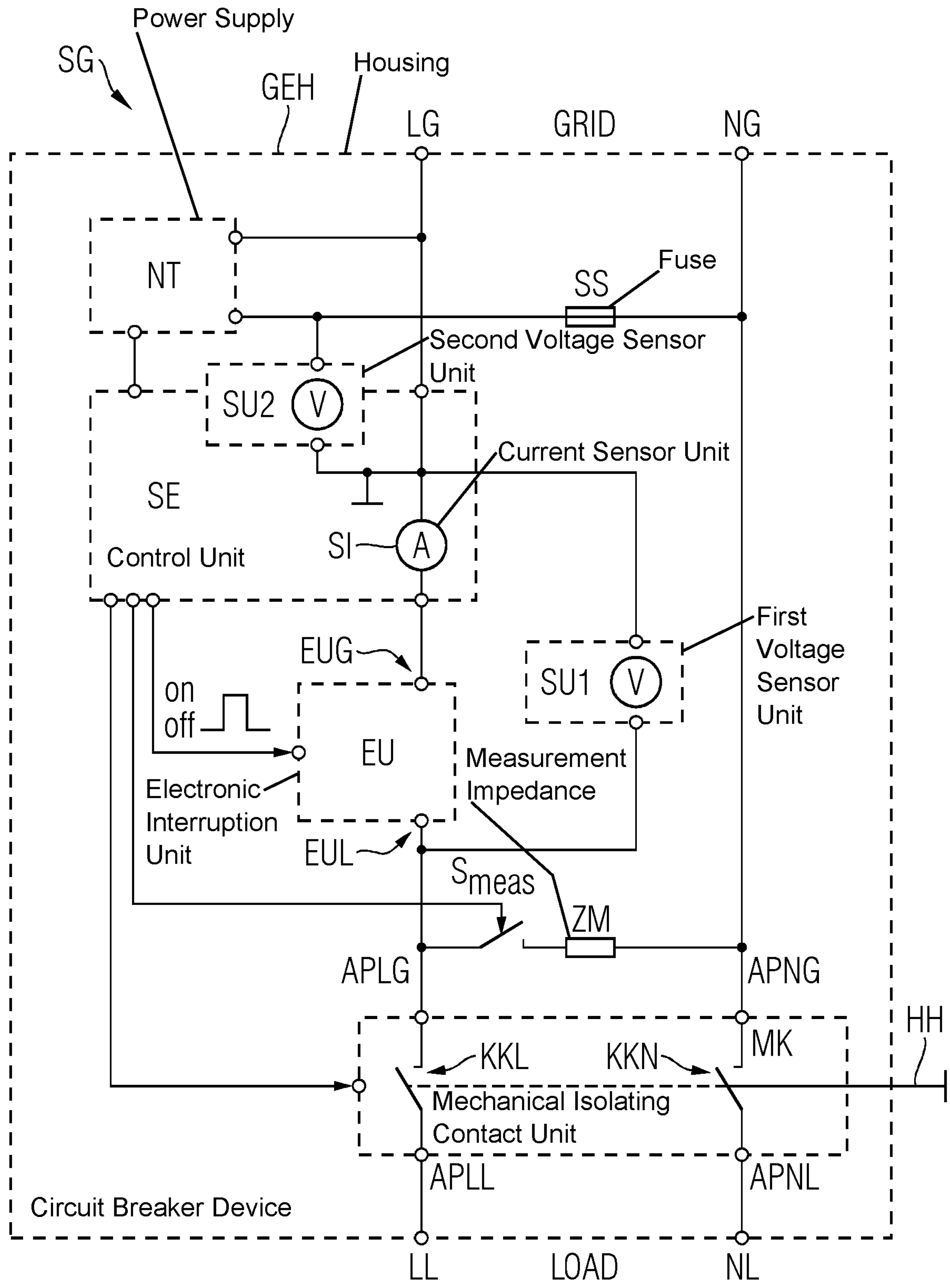
FIG. 1 shows a first illustration of a circuit breaker device.

FIG. 1 shows an illustration of a circuit breaker device SG for protecting an electrical low-voltage circuit, in particular low-voltage AC circuit, having a housing GEH, having:

- a grid-side neutral conductor connection NG, a grid-side phase conductor connection LG, a load-side neutral conductor connection NL, a load-side phase conductor connection LL of the low-voltage circuit;
- a power source is usually connected on the grid side GRID, a consumer is usually connected on the load side LOAD;
- a (two-pole) mechanical isolating contact unit MK having load-side connection points APLL, APNL and grid-side connection points APLG, APNG,
- wherein a load-side connection point APNL is provided for the neutral conductor, a load-side connection point APLL is provided for the phase conductor, a grid-side connection point APNG is provided for the neutral conductor and a grid-side connection point APLG is provided for the phase conductor. The load-side connection points APNL, APLL are connected to the load-side neutral and phase conductor connections NL, LL, such that it is possible to switch between opening contacts KKN, KKL so as to avoid a current flow or closing the contacts to allow a current flow in the low-voltage circuit,
- an in particular single-pole electronic interruption unit EU (which is arranged in particular in the phase conductor in the case of a single-pole design),
- having a grid-side connection point EUG that is electrically connected to the grid-side phase conductor connection LG, and
- a load-side connection point EUL that is electrically connected to the grid-side connection point APLG of the mechanical isolating contact unit MK, wherein the electronic interruption unit, by virtue of semiconductor-based switching elements, has or is able to be switched between a high-resistance state of the switching elements so as to avoid a current flow or a low-resistance state of the switching elements so as to allow a current flow in the low-voltage circuit,
- a current sensor unit SI for ascertaining the level of the current of the low-voltage circuit, which is arranged in particular in the phase conductor,
- a control unit SE that is connected to the current sensor unit SI, the mechanical isolating contact unit MK and the electronic interruption unit EU, wherein, in the event of current or/and current-time limit values being exceeded, avoidance of a current flow in the low-voltage circuit is initiated.

According to the invention, a series circuit consisting of a measurement impedance ZM and a switch Smeas is provided between conductors of the low-voltage circuit such that, when the switch Smeas is closed and the electronic interruption unit EU is switched to the low-resistance state, a measurement current flows through the electronic interruption unit EU via the grid-side connections LG, NG. According to FIG. 1, when the switch Smeas is closed and the contacts of the mechanical isolating contact unit MK are open and the electronic interruption unit EU is switched to the low-resistance state, a measurement current flows through the electronic interruption unit EU via the grid-side connections LG, NG.

According to FIG. 1, the series circuit consisting of the measurement impedance ZM and the switch Smeas is connected between the grid-side connection points APLG, APNG of the mechanical isolating contact unit MK. The series circuit consisting of the measurement impedance ZM and the switch Smeas is connected to the connection (phase conductor) between the mechanical isolating contact unit MK (APLG) and the electronic interruption unit EU (EUL) on one side. The series circuit consisting of the measurement impedance ZM and the switch Smeas is connected, on the other side, to the other conductor (neutral conductor) at the grid-side connection (NG).

The measurement impedance ZM may for example be an electrical resistor or/and capacitor. In particular, the measurement impedance may be a series circuit or(/and) parallel circuit consisting of a resistor or/and capacitor.

The activated (=switched-on) measurement impedance generates a defined potential in the circuit breaker device, in particular a defined voltage potential across the electronic interruption unit EU, specifically at the load-side connection point EUL.

A defined measurement current may also be generated in the circuit breaker device, in particular when the contacts of the mechanical isolating contact unit MK are open.

An additional current may also be generated by the activated measurement impedance without a connected consumer/load being influenced thereby.

Both the measurement current (or additional (measurement) current) may be evaluated according to the invention, (or/and) as may the voltage across specific units, such as for example the electronic interruption unit EU.

The evaluation makes it possible to detect the correct behavior of the units, in particular of the electronic interruption unit EU.

The measurement impedance ZM should have a high value (resistance or impedance value) in order to keep losses low. However, the invention may also use medium and lower values (resistance or impedance values).

By way of example, the resistance value may be less than 1 Mohm, 500 kohm, 100 kohm, 50 kohm, 10 kohm, 5 kohm, 1 kohm, 500 ohm or 100 ohm.

The switch or the activatable measurement impedance make it possible to reduce losses, since (relatively large) losses would only occur when the measurement impedance is switched on and the electronic interruption unit has a low-resistance state.

Figure 2:
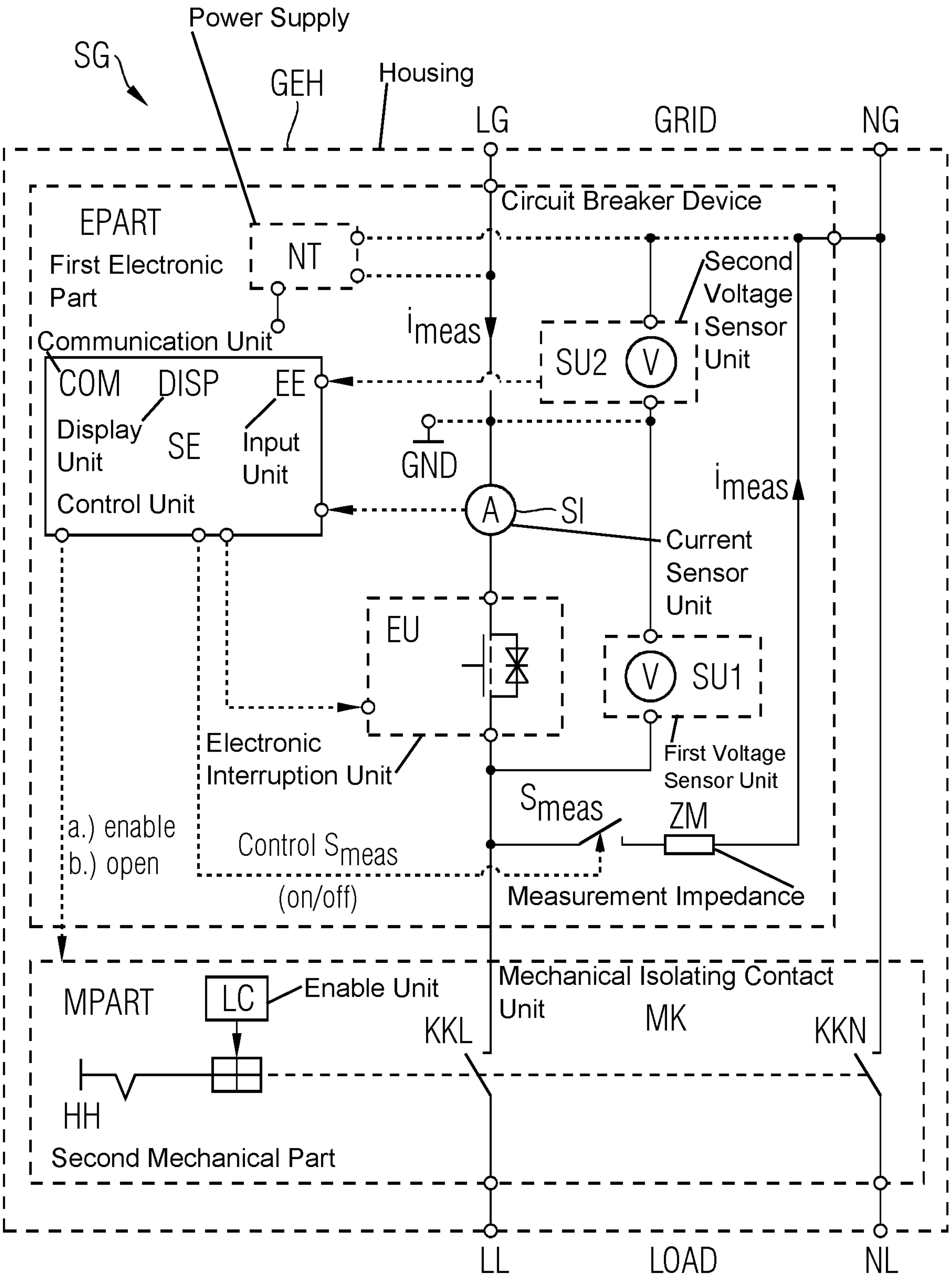
FIG. 2 shows a second illustration of a circuit breaker device.

The switch Smeas is controllable, that is to say able to be switched on and off electrically. The switch in the example is connected to the control unit SE such that it is able to be switched on and off. By way of example, the switch Smeas may be switched on or off (on/off) by a control signal Control Smeas, this being indicated by an arrow from the control unit SE to the switch Smeas ("Control Smeas" with "(on/off)") (FIG. 2). The circuit breaker device is designed such that

- the switch (Smeas) is switched on when the electronic interruption unit (EU) is in the high-resistance state, and in particular such that the switch (Smeas) is switched off when the electronic interruption unit (EU) is in the low-resistance state. Losses caused by the measurement impedance, including at low values, may thus be reduced.

The circuit breaker device may be designed such that the level of the voltage across the electronic interruption unit is able to be ascertained. In other words, the level of a first voltage between grid-side connection point EUG and load-side connection point EUL of the electronic interruption unit EU is able to be ascertained or is ascertained.

For this purpose, in the example according to FIG. 1, provision is made for a first voltage sensor unit SU1 that is connected to the control unit SE and that ascertains the level of the voltage between grid-side connection point EUG and load-side connection point EUL of the electronic interruption unit EU.

In the voltage measurement performed by the first voltage sensor unit SU1, the voltage across the series connection of electronic interruption unit EU and current sensor SI may alternatively also be ascertained, as illustrated in FIG. 1. The current sensor unit SI has a very low internal resistance, meaning that the ascertaining of the level of the voltage is not impaired, or is impaired to a negligible extent.

Advantageously, provision may be made for a second voltage sensor unit SU2 that ascertains the level of the voltage between grid-side neutral conductor connection NG and grid-side phase conductor connection LG.

The first voltage sensor unit may also be replaced by using two voltage measurements (upstream of the electronic interruption unit and downstream of the electronic interruption unit). Calculating a difference ascertains the voltage across the electronic interruption unit.

Provision may thus be made for a/the second voltage sensor unit SU2 that is connected to the control unit SE and that ascertains the level of a second voltage between grid-side neutral conductor connection (NG) and grid-side phase conductor connection (LG). Provision may also be made for a third voltage sensor unit SU3 (not illustrated) that is connected to the control unit and that ascertains the level of a third voltage between grid-side neutral conductor connection NG and load-side connection point EUL of the electronic interruption unit EU. The circuit breaker device is designed such that the level of a/the first voltage between grid-side connection point EUG and load-side connection point EUL of the electronic interruption unit EU is ascertained from the difference between second and third voltage.

In the example according to FIG. 1, the electronic interruption unit EU has a single-pole design, in the example in the phase conductor. In this case, the grid-side connection point APNG for the neutral conductor of the mechanical isolating contact unit MK is connected to the grid-side neutral conductor connection NG of the housing GEH.

The circuit breaker device SG is advantageously designed such that the contacts of the mechanical isolating contact unit MK are able to be opened, but not closed, by the control unit SE, which is indicated by an arrow with "b.) open" from the control unit SE to the mechanical isolating contact unit MK (FIG. 2).

The mechanical isolating contact unit MK is able to be operated by a mechanical handle HH on the circuit breaker device SG in order to switch between manual opening or closing of the contacts KKL, KKN. The mechanical handle HH indicates the switching state (open or closed) of the contacts of the mechanical isolating contact unit MK.

The contact position (or the position of the handle, closed or open) may also be able to be transmitted to the control unit SE. The contact position (or the position of the handle) may be ascertained for example by way of a sensor.

The mechanical isolating contact unit MK is advantageously designed such that it is possible to (manually) close the contacts using the mechanical handle only after an enable, in particular an enable signal. This is likewise indicated by the arrow with "a.) enable" from the control unit SE to the mechanical isolating contact unit MK (FIG. 2). In other words, the contacts KKL, KKN of the mechanical isolating contact unit MK are able to be closed by the handle HH only when the enable or the enable signal (from the control unit) is present. Without the enable or the enable signal, although the handle HH is able to be actuated, the contacts are not closed ("permanent slider contacts"). A further enable unit LC may be provided for this purpose (FIG. 2).

The circuit breaker device SG has a power supply NT, for example a power supply unit. The power supply NT is provided in particular for the control unit SE, which is indicated by a connection between power supply NT and control unit SE in FIG. 1. The power supply NT is connected (on the other side) to the grid-side neutral conductor connection NG and the grid-side phase conductor connection LG. Provision may advantageously be made for a fuse SS, in particular thermal fuse, in the connection to the grid-side neutral conductor connection NG (or/and phase conductor connection LG).

As an alternative, the measurement impedance ZM may be connected to the grid-side neutral conductor connection LG via the fuse SS.

Advantageously, a three-pole electronic unit EPART (FIG. 2) may be implemented, for example in the form of a module that has three connection points, one neutral conductor connection point and two phase conductor connection points. The electronic unit EPART has for example the electronic interruption unit EU, the control unit SE, the power supply NT (in particular including fuse SS), the current sensor unit SI, the first voltage sensor unit SU1, optionally the second voltage sensor unit SU2, and the series circuit consisting of (electrically switchable) switch Smeas and measurement impedance ZM.

A high-resistance state is understood to mean a state in which only a current of negligible magnitude flows. High-resistance resistance values are in particular understood to mean those greater than 1 kiloohm, better still greater than 10 kiloohms, 100 kiloohms, 1 megaohm, 10 megaohms, 100 megaohms, 1 gigaohm or more.

A low-resistance state is understood to mean a state in which the current value indicated on the circuit breaker device could flow. Low-resistance resistance values are in particular understood to mean those less than 10 ohms, better still less than 1 ohm, 100 milliohms, 10 milliohms, 1 milliohm or less.

FIG. 2 shows an illustration according to FIG. 1 with the difference that the circuit breaker device is substantially of two-part design, with a first (three-pole) part/electronic unit EPART and a second mechanical part/mechanical unit MPART. The electronic first part EPART may be arranged for example on a circuit board/printed circuit board and contains the abovementioned or illustrated units.

The first part EPART has only three connections:

the grid-side phase conductor connection LG, a connection for the or to the grid-side phase conductor connection point APLG of the mechanical isolating contact unit MK, a third connection for a connection to the grid-side neutral conductor connection NG.

The second part MPART may have the mechanical isolating contact unit MK, the handle HH, and an enable unit LC. The second part may also have a position unit POS (not illustrated) for reporting the position of the contacts of the mechanical isolating contact unit MK to the control unit, and the (one or more neutral conductor) connections.

Provision may be made for further units that are not shown in more detail.

The division into two parts advantageously makes it possible to achieve a compact circuit breaker device according to the invention.

The circuit breaker device may also have a communication unit COM, a display unit DISP and an input unit EE. These may be assigned to the control unit SE or connected thereto, as indicated in FIG. 2.

The circuit breaker device SG operates for example in principle such that, when the contacts of the mechanical isolating contact unit are closed and the interruption unit is in the low-resistance state and in the event of an ascertained current that exceeds a first current value, in particular when the first current value is exceeded for a first time limit, the electronic interruption unit EU changes to the high-resistance state and the mechanical isolating contact unit MK remains closed, in the event of an ascertained current that exceeds a higher second current value, in particular for a second time limit, the electronic interruption unit EU changes to the high-resistance state and the mechanical isolating contact unit MK is opened, in the event of an ascertained current that exceeds an even higher third current value, the electronic interruption unit changes to the high-resistance state and the mechanical isolating contact unit MK is opened.

The invention is described in other words in more detail below for the circuit breaker device SG.

To test the function of the electronic interruption unit EU, provision is made for a current measurement or/and voltage measurement across the electronic interruption unit EU. If the electronic interruption unit EU is in the high-resistance state, then the potential between the electronic interruption unit EU (EUL) and the mechanical isolating contact unit MK (APLG) is undetermined when the contacts are open or is jointly determined by the connected load/consumer when the contacts are closed. According to the invention, provision is made for a measurement impedance between this point and the other conductor/neutral conductor in the circuit breaker device. The electrical potential at this point is thus (jointly) defined. The design of the measurement impedance is problematic since, for an accurate measurement, on the one hand, the value of the measurement impedance (for example resistor) should be as small as possible (compared to the resistance of the electronic interruption unit EU in the high-resistance state). On the other hand, the measurement impedance is arranged/connected between the two conductors/phase conductors and neutral conductor, as a result of which losses constantly arise, meaning that the value of the measurement impedance should be as large as possible. To consider both cases, a compromise must be made in terms of design.

There is additionally the problem that a small leakage current flows through the electronic interruption unit EU when it is in the high-resistance state. Depending on the connected load/consumer, the load may be supplied with very low power via this leakage current. In particular for loads that require very little power (for example LEDs), this May lead to power being supplied to these loads, which is undesirable.

According to the invention, what is proposed is a series circuit consisting of an (electrically) switchable switch Smeas and a measurement impedance, such as for example a measurement resistor that is able to be switched on in the circuit breaker device. The measurement impedance ZM is able to be switched on and off via the for example (semiconductor) switch Smeas.

If the electronic interruption unit EU is in the high-resistance (switched-off) state (device state: standby), the measurement impedance may be switched on (switch Smeas on or closed), in order to define the potential at the load-side connection point or connection point EUL of the electronic interruption unit EU and to implement an electrically conductive connection from this point to the grid-side neutral conductor connection. The measurement impedance then forms a high-resistance voltage divider together with the high-resistance/switched-off electronic interruption unit EU. The voltage divider is in this case dimensioned such that the majority of the grid voltage drops across the switched-off/high-resistance electronic interruption unit. A value of the protective extra-low voltage, that is to say at most 50 V, may advantageously drop across the measurement impedance.

In other words, the voltage divider is dimensioned such that a maximum voltage value of for example 50 volts AC (RMS value) drops across the switched-on measurement resistor (in a 230-volt low-voltage circuit). A voltage measurement across the electronic interruption unit EU may be used to test or to monitor the functionality of the electronic interruption unit EU.

Advantageously, the switched-on measurement impedance leaks a leakage current that is constantly present and caused for example by existing (parasitic) capacitances in the electronic interruption EU to the grid-side neutral conductor connection. This leakage current is usually smaller than 1 mA, but may lead to an undesirable flow of power to the load, which is thus avoided.

The measurement impedance should be dimensioned/designed based on the following points.

The measurement impedance, together with the switched-off electronic interruption unit EU, forms a high-resistance voltage divider. This voltage divider should be dimensioned such that the voltage drop across the measurement impedance is less than protective extra-low voltage (50 Vac), since this voltage arises at the load-side connections LL, NL. By way of example, the measurement impedance may be 10% of the impedance of the switched-off electronic interruption unit. If this is for example 2 Mohm, the value of the measurement impedance ZM should be less than 200 kohm. The maximum 23 Vac may then occur at the load-side connections LL, NL.

The measurement impedance ZM protects the switch Smeas from overvoltages (for example surges). In the switched-on state and when the contacts are closed, the switch Smeas and the measurement impedance ZM are between phase conductor and neutral conductor. In the event of grid overvoltages (for example triggered by surge events), this would lead to the switch Smeas being loaded. In this case, the measurement impedance ZM protects the switch Smeas from destruction, since it constitutes a large series resistance and thus prevents a relatively high impulse current in the device.

The measurement impedance ZM may furthermore be dimensioned such that the circuit breaker device is protected from thermal destruction in the event of a defective switch Smeas. The current that would flow through the measurement impedance in this case is limited to a maximum value, for example a few 10 mA, by the measurement impedance.

In addition to being used to test the function of the electronic switch and the leaking of a leakage current, a further function for the measurement impedance that is able to be switched on is conceivable. The measurement impedance that is able to be switched on may be used, when dimensioned or designed appropriately, to check and possibly calibrate the current measurement involved. The control unit SE switches on the electronic interruption unit EU and the switch Smeas such that (in particular when the contacts of the mechanical isolating contact unit MK are open) a measurement current imeas (FIG. 2) flows and is detected by the current sensor unit SI. Depending on the dimensioning of the measurement impedance, this current May be in the range of a few mA or a few 10 mA such that the current measurement (current sensor unit SI and control unit SE) is thereby able to be checked for a corresponding functionality. After the function test, the electronic interruption unit EU is switched back to the high-resistance state. The measurement lasts only a few ms, for example 10 ms, 20 ms, or a (different) multiple of half the grid period duration.

The test and possibly calibration may advantageously take place before the closure of the contacts of the mechanical isolating contact unit is enabled using the handle, so that the function test or calibration of the current measurement is performed before the enable: ability to switch on the isolating contacts. Furthermore, the measurement (with appropriate dimensioning) may also take place when the contacts are closed and the electronic interruption unit EU is in the low-resistance state by briefly closing the switch Smeas and generating an additional (measurement) current through the measurement impedance in the circuit.

The additional measurement current imeas is then detected via the current sensor unit, evaluated by the control unit (algorithm) in order in particular to be distinguished from the normal load current.

The invention has the following advantages:

1.) More accurate voltage measurement across the electronic interruption unit EU to test the function of the electronic interruption unit EU, due to lower resistance values.

2.) Reduced losses in the device, since the measurement impedance is able to be switched off in the low-resistance state of the electronic interruption unit EU.

3.) Leakage of leakage currents from the electronic interruption unit EU in the high-resistance state of the electronic interruption unit EU.

4.) Possibility to check and calibrate the current measurement.

5.) The contact voltage at the load-side connections is limited in the high-resistance state of the electronic interruption unit EU.

Also proposed is a computer program product or algorithm that switches the electronic interruption unit EU or the switch Smeas on and off at appropriate times (instantaneous value of the grid voltage) and at the same time evaluates the measured current and voltage values in order to recognize that the electronic interruption unit is functional or not functional.

The control unit SE may (for this purpose) have a microcontroller. The computer program product may be executed on the microcontroller. The computer program product comprises instructions that, when the program is executed by the microcontroller, prompt said microcontroller to control the circuit breaker device, in particular to assist, in particular to perform, the method according to the invention.

The computer program product may be stored on a computer-readable storage medium, such as a CD-ROM, a USB stick or the like.

There may also be a data carrier signal that transfers the computer program product.

Although the invention has been described and illustrated in more detail by the exemplary embodiment, the invention is not restricted by the disclosed examples and other variations may be derived therefrom by a person skilled in the art without departing from the scope of the invention.

The invention claimed is:

1. A circuit breaker device for protecting an electrical low-voltage circuit, the circuit breaker device comprising:

a housing having grid-side connections and at least one load-side connection;

an electronic interruption unit, said electronic interruption unit being associated with said grid-side connections;

a mechanical isolating contact unit connected in series with said electronic interruption unit, said mechanical isolating contact unit being associated with said at least one load-side connection;

said mechanical isolating contact unit having contacts, and said mechanical isolating contact unit configured to be switched by opening said contacts to avoid a current flow or closing said contacts to allow the current flow in the low-voltage circuit;

said electronic interruption unit having semiconductor-based switching elements, and said electronic interruption unit configured to be switched by said semiconductor-based switching elements to a high-resistance state of said semiconductor-based switching elements to avoid the current flow or a low-resistance state of said semiconductor-based switching elements to allow the current flow in the low-voltage circuit;

a current sensor unit for ascertaining a current level of the low-voltage circuit;

a control unit connected to said current sensor unit, to said mechanical isolating contact unit and to said electronic interruption unit, for initiating avoidance of the current flow in the low-voltage circuit upon exceeding at least one of current or current-time limit values; and a series circuit formed of a measurement impedance and a switch, said series circuit being provided between conductors of the low-voltage circuit for causing a measurement current to flow through said electronic interruption unit via said grid-side connections upon said switch being closed and said electronic interruption unit being switched to the low-resistance state.

2. The circuit breaker device according to claim 1, wherein the measurement current flows through said electronic interruption unit via said grid-side connections, when said switch is closed and said contacts of said mechanical isolating contact unit are open and said electronic interruption unit is switched to the low-resistance state.

3. The circuit breaker device according to claim 1, wherein said series circuit formed of said measurement impedance and said switch is connected on one side to a connection between said mechanical isolating contact unit and said electronic interruption unit.

4. The circuit breaker device according to claim 2, wherein said series circuit formed of said measurement impedance and said switch is connected on another side to another conductor at said grid-side connection.

5. The circuit breaker device according to claim 1, wherein said measurement impedance is at least one of an electrical resistor or a capacitor.

6. The circuit breaker device according to claim 1, wherein said measurement impedance is a series circuit or a parallel circuit formed of an electrical resistor and capacitor.

7. The circuit breaker device according to claim 1, wherein said measurement impedance has a resistance value of less than 1 Mohm.

8. The circuit breaker device according to claim 1, wherein said measurement impedance has a resistance value of less than 100 ohm.

9. The circuit breaker device according to claim 1, wherein said measurement impedance has a resistance value of between 1 Mohm and 100 ohm.

10. The circuit breaker device according to claim 1, wherein:

said switch is connected to said control unit, permitting said switch to be switched on and off by said control unit;

said switch is switched on when said electronic interruption unit is in the high-resistance state, and said switch is switched off when said electronic interruption unit is in the low-resistance state.

11. The circuit breaker device according to claim 1, wherein:

said current sensor unit ascertains the current level when said electronic interruption unit is in the high-resistance state and said switch is switched on; and in an event of a first current threshold value being exceeded, said electronic interruption unit being faulty is inferred, and said mechanical isolating contact unit is not able to be closed or is opened.

12. The circuit breaker device according to claim 1, wherein, in order to test functionality of the circuit breaker device when said contacts of said mechanical isolating contact unit are open and said electronic interruption unit is switched to the high-resistance state and said switch is switched on, said electronic interruption unit is switched to the low-resistance state for a first time interval without said switch being switched off, and the measurement current flows through said measurement impedance in order to test the functionality of the circuit breaker device or of said electronic interruption unit.

13. The circuit breaker device according to claim 12, wherein the functionality test of the circuit breaker device:

includes ascertaining the level of the measurement current by way of said current sensor unit, and comparing the level of the ascertained measurement current with a reference measurement current level and, in an event of a deviation from the reference measurement current level being outside of a first tolerance range, inferring a faulty circuit breaker device, or not being able to close or open said mechanical isolating contact unit, or includes ascertaining a level of a voltage across said electronic interruption unit, and comparing the level of the ascertained voltage with a reference voltage level and, in an event of a deviation from the reference voltage level being outside of a second tolerance range, inferring that said electronic interruption unit is faulty, and not being able to close or opening said mechanical isolating contact unit.

14. The circuit breaker device according to claim 12, wherein the measurement current is used to calibrate the level of the current ascertained by said current sensor unit.

15. The circuit breaker device according to claim 12, wherein the measurement current is used to calibrate the level of the current ascertained by said current sensor unit after the functionality of the circuit breaker has been tested.

16. The circuit breaker device according to claim 1, wherein, in order to test a functionality of the circuit breaker device when said contacts of said mechanical isolating contact unit are closed and said electronic interruption unit is switched to the low-resistance state and when said switch is switched off, said switch is switched to a closed state for a first time range causing an additional current caused by said measurement impedance to flow through said electronic interruption unit, a level of the additional current is ascertained and is compared with additional current values and, in an event of a deviation outside of a tolerance range, a current fault condition is present.

17. The circuit breaker device according to claim 16, wherein said switch is switched to the closed state for the first time range when the level of the current ascertained by said current sensor unit falls below a first current level, in order to ascertain a faulty circuit breaker device or a faulty current sensor unit or current detection.

18. A method for operating a circuit breaker device for protecting an electrical low-voltage circuit, the method comprising:

providing a housing having grid-side connections and at least one load-side connection;

connecting a mechanical isolating contact unit in series with an electronic interruption unit, the mechanical isolating contact unit having contacts, and the electronic interruption unit having semiconductor-based switching elements;

connecting the mechanical isolating contact unit to the load-side connection and connecting the electronic interruption unit to the grid-side connections;

switching the mechanical isolating contact unit by opening the contacts to avoid a current flow or closing the contacts to allow the current flow in the low-voltage circuit;

switching the electronic interruption unit by switching the semiconductor-based switching elements to a high-resistance state of the semiconductor-based switching elements to avoid the current flow or to a low-resistance state of the semiconductor-based switching elements to allow the current flow in the low-voltage circuit;

ascertaining a current level of the low-voltage circuit and, upon exceeding at least one of current or current-time limit values, initiating avoidance of the current flow in the low-voltage circuit; and providing a series circuit formed of a measurement impedance and a switch in the circuit breaker device between conductors of the low-voltage circuit, causing a measurement current to flow through the electronic interruption unit via the grid-side connections when the switch is closed and the electronic interruption unit is switched to the low-resistance state.

19. The method according to claim 18, which further comprises switching on the switch when the electronic interruption unit is in the high-resistance state and switching off the switch when the electronic interruption unit is in the low-resistance state.

* * * * *